United States Patent
Reissig

(10) Patent No.: US 7,000,401 B2
(45) Date of Patent: Feb. 21, 2006

(54) METHOD FOR OPERATING A STEAM POWER PLANT AND STEAM POWER PLANT FOR CARRYING OUT SAID METHOD

(75) Inventor: Sergej Reissig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/755,737

(22) Filed: Jan. 12, 2004

(65) Prior Publication Data

US 2004/0139749 A1     Jul. 22, 2004

Related U.S. Application Data

(63) Continuation of application No. PCT/EP02/07243, filed on Jul. 1, 2002.

(30) Foreign Application Priority Data

Jul. 12, 2001   (EP) ................................ 01117051

(51) Int. Cl.
    *F01K 23/10* (2006.01)
(52) U.S. Cl. ..................... 60/773; 60/39.182
(58) Field of Classification Search ............ 60/39.181, 60/39.182, 683, 645, 29.182, 39.511, 772, 60/773
    See application file for complete search history.

(56) References Cited

U.S. PATENT DOCUMENTS

| 2,404,938 | A | * | 7/1946 | Armacost et al. ............. 60/683 |
| 2,539,255 | A | | 1/1951 | Karrer et al. |
| 2,717,491 | A | | 9/1955 | Barr |
| 4,414,813 | A | * | 11/1983 | Knapp ......................... 60/655 |
| 6,167,706 | B1 | * | 1/2001 | Bronicki et al. ............. 60/651 |

FOREIGN PATENT DOCUMENTS

| DE | 820 600 | 11/1951 |
| DE | 1 133 186 | 7/1962 |
| DE | 42 27 146 A1 | 2/1994 |

* cited by examiner

*Primary Examiner*—Ehud Gartenberg

(57) ABSTRACT

The invention relates to a method for operating a steam power plant comprising a steam generator and a combustion chamber associated therewith, wherein pre-warmed combustion air is guided therein in addition to a fossil fuel. According to the invention, said plant can be operated with a particularly high efficiency ratio in various operating conditions. As a result, the combustion air is at least partially released after the pre-warming thereof and before the introduction thereof into the combustion chamber. A steam power plant which is particularly suitable for carrying out said method comprises, in addition to a pre-air warmer, an air turbine which is mounted downstream from said pre-air warmer in a fresh air pipe.

12 Claims, 2 Drawing Sheets

METHOD FOR OPERATING A STEAM POWER PLANT AND STEAM POWER PLANT FOR CARRYING OUT SAID METHOD

CROSS REFERENCE TO RELATED APPLICATIONS

This application is a continuation of International Application No. PCT/EP02/07243, filed Jul. 1, 2002 and claims the benefit thereof. The International Application claims the benefits of European application No. 01117051.1 filed Jul. 12, 2001, both of the applications are incorporated by reference herein in their entirety.

FIELD OF THE INVENTION

The invention relates to a method for operating a steam power plant comprising a steam generator and a combustion chamber associated therewith, into which pre-warmed combustion air is fed in addition to a fossil fuel. It also concerns a steam power plant suitable for carrying out the method with a steam generator and a combustion chamber associated therewith for the combustion of a fossil fuel that is connected on the inlet side to both a fuel pipe and a fresh air pipe for combustion air.

BACKGROUND OF INVENTION

A steam turbine is usually used in a power plant for driving a generator or in an industrial plant for driving a machine. As a result, steam serving as a flow medium is fed to the steam turbine and is released in the steam turbine in an output-producing manner. After its release, the steam usually arrives at one of the condensers mounted downstream of the steam turbine and condenses there. The condensate is then fed as feed water to a steam generator and then again arrives in the steam turbine after its evaporation, so that there is a closed water-steam circuit. A plant with the relevant components, i.e. particularly with a steam turbine and a steam generator is also designated as a steam turbine plant or steam power plant.

A combustion chamber in which a fuel is burnt is usually assigned to the steam generator of such a steam power plant. The hot flue gases usually arising during the combustion of fossil fuels are then conveyed through the steam generator, in which case they are used for steam generation by means of heat exchange with the flow medium conveyed in the water-steam circuit.

For the combustion of fuel, fresh air or combustion air needs to be fed to the combustion chamber assigned to the steam generator. As a result, the combustion chamber is usually connected on the inlet side not only to a fuel pipe but also to a fresh air pipe for the combustion air. Via the fresh air pipe, the combustion air is fed to the combustion chamber, in which case the comparatively high pressure level required for feeding the combustion air into the combustion chamber is provided via a pneumatic conveyor mounted in the fresh air pipe.

When designing such a steam power plant, a customary design goal is a particularly high plant efficiency ratio when converting the energy stored in the fuel to electrical energy or energy that can be used in other operating conditions. Therefore, for example, the plant process of such a steam power plant, particularly its operating parameters, is specified or selected in such a way that for thermodynamic reasons a particularly favorable transfer of energy can be obtained. To this end, among other things, the combustion air to be fed to the combustion chamber is usually pre-warmed to a comparatively high temperature level because this favors the efficiency ratio of the actual combustion process. Such a pre-warming of the combustion air can be carried out, for example, inside the actual steam generator, in which case the energy content is partially used for pre-warming the air during the combustion of the generated flue gas.

SUMMARY OF INVENTION

The object of the invention is to specify a method for operating a steam power plant of the above-mentioned type, wherein a particularly high plant efficiency ratio can be reached in various operating states and particularly in the partial-load region.

Further, a steam power plant particularly suited to carrying out the method is specified.

Regarding the method, this object is achieved according to the invention by partially releasing the combustion air in an output-producing manner after it has been pre-warmed and before it is fed to the combustion chamber.

The invention then also takes into consideration that a particularly high plant efficiency ratio in various operating states can be obtained by setting as many operating parameters as required. However, pre-warming the combustion air only takes place to a limited extent on the basis of the customary static structure of the air pre-warmer—for example, in the steam generator. On the other hand, the combustion air can also be heated when pre-warming it to a temperature level that, for thermodynamic reasons, clearly exceeds the most favorable temperature level for the specific operating state of the plant. In order to counteract this, provision is made for at least partial utilization of the energy content of the compressed air and pre-warmed combustion air before it enters the combustion chamber. As a result, the combustion air is partially released before it enters the combustion chamber, in which case the combustion air is cooled to a temperature level adapted to the specific operating state of the plant and particularly favorable for thermodynamic reasons. As a result of the release, the combustion air is brought to the operating parameters of the combustion air that are particularly favorable for the specific plant condition, in which case its energy content is still partially utilized.

Therefore, a particularly high plant efficiency ratio can be obtained by using, in an advantageous further development, the output gained when releasing the pre-warmed combustion air for driving a pneumatic conveyor provided for compressing the combustion air. Therefore, a comparatively direct provision of the drive energy for the pneumatic conveyor is possible. On the other hand, the drive of the pneumatic conveyor is usually mounted electrically in the fresh air pipe of known plants. The driving power required for this is then provided via the generator assigned to the steam power plant. Therefore, in the case of previous known plants, the driving power required to drive the pneumatic conveyor is in essence provided from the energy content of the fuel, in which case many loss-carrying energy conversion steps are however required through to generating the electrical energy in the generator that is, in the end, again converted into driving energy for the pneumatic conveyor. By way of the comparatively direct drive of the pneumatic conveyor via the output gained when releasing the pre-warmed combustion air, many loss-carrying energy conversion steps can be saved, which in itself already presupposes an increase in the total efficiency of the plant.

In order to adhere to, even under varying operating conditions of the steam power plant, a temperature level that is particularly favorable for thermodynamic reasons when feeding the combustion air into the combustion chamber, in an advantageous development an operating parameter for releasing the combustion air on the basis of a characteristic value is set for the temperature of the combustion air flowing toward the combustion chamber. The output extracted during the release can for example be set as an operating parameter for releasing the combustion air, as a function of an actual temperature value. Therefore it can be ensured that the combustion air flowing toward the combustion chamber, also in the case of varying load conditions of the plant, always has a sufficiently high temperature level for a thermodynamically favorable combustion of the fuel.

The combustion air can be pre-warmed at many suitable places within the steam power plant. However, the combustion air is advantageously pre-warmed within the steam generator and therefore via flue gas from the combustion chamber.

In an alternative or additional advantageous embodiment, the combustion air is pre-warmed via flue gas flowing from an assigned gas turbine. In this way, in the type of steam turbine plant combined with a gas turbine plant, it is possible to utilize the heat still carried in the flue gas flowing from the gas turbine by feeding it into the process of the steam power plant.

Advantageously, this heat is on the one hand used for pre-warming air and, on the other hand, by releasing the pre-warmed combustion air, for driving the pneumatic conveyor mounted in the fresh air pipe, so that the energy content of the fuel fed to the combustion chamber of the steam generator can be used more or less exclusively and in a focused manner for generating the electrical energy or output via the assigned steam turbine.

In the case of such a steam power plant combined with a gas turbine plant, heat still carried in the flue gas flowing from the gas turbine is further used to pre-warm the feed water for the steam generator in a further advantageous embodiment.

With regard to the steam power plant, the above-mentioned object of the invention is achieved by also mounting, in addition to an air pre-warmer, an air turbine which is mounted downstream of said air pre-warmer in the fresh air pipe connected to the combustion chamber assigned to the steam generator. Therefore, the pre-warmed combustion air can be released via the air turbine before it enters the combustion chamber, in a manner that is adapted to the specific operating condition of the plant as required.

In an advantageous way, the air turbine then drives a pneumatic conveyor mounted upstream of said air pre-warmer in the fresh air pipe. This can result, for example, in the air turbine and the pneumatic conveyor being arranged on a common shaft by interconnecting a suitable transmission, if required. Particularly in the case of such a circuit, those loss-carrying intermediate stages are omitted for the conversion of energy in which the heat from the combustion air is first of all used for generating steam and then power if the pneumatic conveyor is driven electrically.

Therefore, in a further advantageous embodiment, the pneumatic conveyor is also embodied as an air compressor that can generate an output pressure of approximately 4 to 5 bar. Together with the additionally provided warming up of the compressed air, preferably to a temperature of approximately 500° C.–550° C., a particularly effective utilization of the energy content in the compressed and pre-warmed air is made possible.

In order to be able to set an operating parameter for the air turbine, particularly of the output extracted from the pre-warmed combustion air during release, to the specific operating state of the plant as required, a regulating device assigned advantageously to the air turbine on the inlet side is connected to a temperature sensor arranged in the fresh air pipe.

The air pre-warmer is arranged in an advantageous development within the steam generator so that the combustion air flowing toward the combustion chamber can be heated via flue gas from the combustion chamber. Therefore, the air pre-warmer is advantageously mounted on the primary-side in the flue gas flow flowing from the combustion chamber.

The steam power plant is also particularly suitable for a flexible and compact combination with a gas turbine plant.

Therefore, as a particularly advantageous embodiment a utilization of the residual heat carried along in the waste gas from the gas turbine to pre-warm the combustion air for the combustion chamber of the steam power plant is provided. Therefore, the air pre-warmer is advantageously mounted on the primary side in a flue gas duct mounted downstream of a gas turbine.

In a further advantageous embodiment, in such a combination of a gas turbine plant with a steam power plant, the residual heat in the waste gas from the gas turbine is still used to pre-warm the feed water for the steam generator. Therefore, a feed water pre-warmer assigned to a steam generator is conveniently mounted on the primary side to the flue gas duct mounted downstream of the gas turbine.

The advantages achieved with the invention particularly consist in the fact that because the combustion air is at least partially released after it is pre-warmed and before it is introduced into the combustion chamber, particularly favorable operating parameters for the combustion air, particularly a favorable pressure level and a favorable temperature level, can be set for the specific operating state of the plant on the one hand. On the other hand, the energy content carried in the pre-warmed combustion air can be used for the plant process comparatively directly and in a manner which increases the efficiency ratio. Therefore, such a steam power plant is particularly suitable for utilization as a steam power plant, i.e. in conjunction with a steam turbine, because there the efficiency ratio is usually a very important design criterion.

In addition, such a concept is particularly advantageous when burning comparatively highly slag-forming fuels such as brown coal, coal or oil shale. As slagging of the combustion chamber increases, the heat transfer is reduced and the heat evolved that can be felt in the steam generator then shifts toward its outlet, so that an air pre-warmer arranged in this area is comparatively exposed to increased heating. Therefore, in such a case, the temperature of the combustion air flowing to the combustion chamber can still be increased, which in turn intensifies the slagging process. Especially in this case, an output-producing release of the pre-warmed combustion air can thus bring the temperature level of said combustion air flowing into the combustion chamber to values adapted in a manner particularly suitable for operation, it being possible to use the output extracted from the combustion air in a manner which increases the efficiency ratio.

Such a developed steam power plant can also be designed comparatively compactly and simply, in which case for simple controllability bleeder points on the steam turbine or a pre-warmer section can in particular be dispensed with completely.

BRIEF DESCRIPTION OF THE DRAWINGS

Embodiments of the invention are explained in greater detail on the basis of drawings. These are as follows.

The same parts are provided in both figures with the same reference characters.

DETAILED DESCRIPTION OF INVENTION

Figure 1:
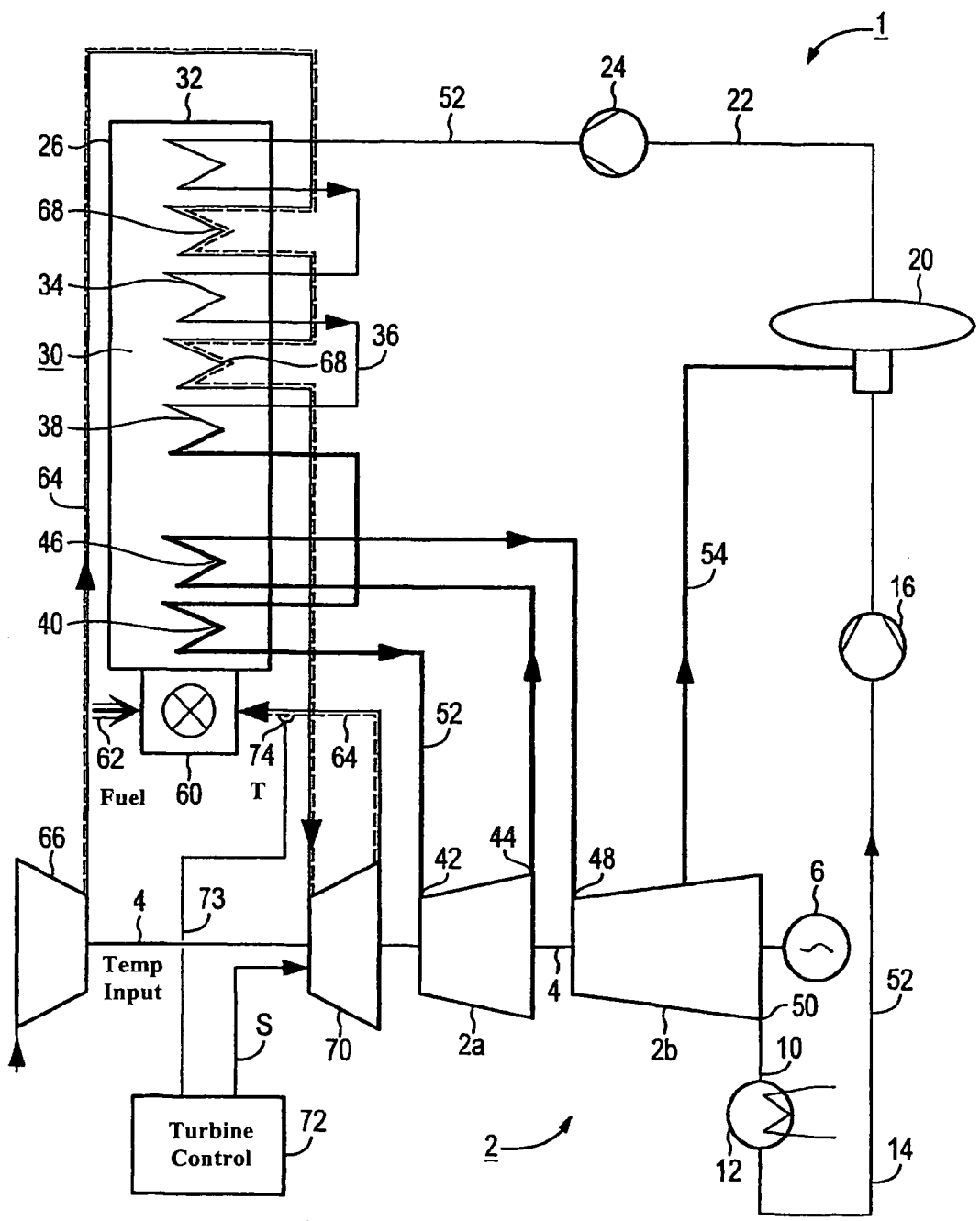
FIG. 1 diagram of a steam power plant.

The steam power plant 1 according to FIG. 1 is provided for generating electrical energy and includes a steam turbine 2 for this purpose that is connected to a generator 6 via a turbine shaft 4. In the embodiment, the steam turbine 2 includes a high-pressure part 2a and a low-pressure part 2b. Therefore, the steam turbine 2 is embodied in two stages. However as an alternative, the steam turbine 2 can also include only one or several, particularly three, pressure stages.

The steam turbine 2 is connected to a condenser 12 on the outlet side via a steam pipe 10. The condenser 12 is connected to a feed water container 20 via a pipe 14 in which a condensate pump 16 is mounted. The feed water container 20 is connected on the outlet side to a heating surface arrangement 30 arranged in a steam generator 26 via a feed pipe 22 in which a feed water pump 24 is mounted.

The heating surface arrangement 30 includes many pre-warming surfaces 32, 34 designated as economizers that are connected on the outlet side to an evaporator heating surface 38 via an overflow pipe 36. The evaporator heating surface 38 can then be embodied as a pass-through evaporator heating surface or a natural circulation evaporator heating surface. To this end the evaporator heating surface 38 can then be connected in a known way to a water-steam drum (not shown in the embodiment) for the formation of a circulation.

The evaporator heating surface 38 is also connected to a high-pressure superheater 40 arranged in the steam generator 26, said high-pressure superheater 40 being connected on the outlet side to the steam inlet 42 of the high-pressure part 2a of the steam turbine 2. The steam outlet 44 of the high-pressure part 2a of the steam turbine 2 is connected to the steam inlet 48 of the low-pressure part 2b of the steam turbine 2 via an intermediate superheater 46. Its steam outlet 50 is connected to the condenser 12 via the steam pipe 10 to form a closed water-steam circuit 52.

Therefore, the water-steam circuit 52 shown in FIG. 1 only consists of two pressure stages. However, it can consist of only one or several, particularly three, pressure stages, in which case further heating surfaces can be arranged in a steam generator 26 in a known way. The low-pressure part 2b of the steam turbine 2 is moreover connected to the feed water container 20 via a bleeder steam pipe 54 to release the condensate, as required.

A fossil-fired combustion chamber 60 is assigned to a steam generator 26. A fossil fuel can be applied to the combustion chamber 60 via a fuel supply pipe 62 and combustion air for the combustion can be applied via a fresh air pipe 64. In order to ensure a pressure level that is sufficient for delivering the combustion air to the combustion chamber 60, a pneumatic conveyor 66 is mounted in the fresh air pipe 64. Therefore, the pneumatic conveyor 66 is embodied as an air compressor that on the outlet side generates an operating pressure of compressed air of approximately 4 to 5 bar. In addition, in the case of the steam power plant 1, a pre-warming of the combustion air before the introduction thereof into the combustion chamber 60 is provided to ensure a temperature level in the combustion chamber 60 which is sufficient for thermodynamic reasons for a high efficiency ratio during combustion. Therefore, an air pre-warmer 68 designed with two stages in the embodiment is mounted in the fresh air pipe 64 and is arranged in the steam generator 26, and is therefore heated on the primary side by the flue gas from the combustion chamber 60.

The steam power plant 1 is designed for a particularly high efficiency ratio even under changing operating conditions. Therefore, for a high plant efficiency ratio the combustion air is at least partially released before the introduction thereof into the combustion chamber 60 as required. For this, an air turbine 70 is mounted in the fresh air pipe 64 between the air pre-warmer 68 and the combustion chamber 60. In the same way as the pneumatic conveyor 66, the air turbine 70 is also arranged together with the high-pressure part 2a and the low-pressure part 2b on the turbine shaft 4. The air turbine 70 therefore drives the pneumatic conveyor 66 via the turbine shaft 4.

A regulating device 72 is assigned to the air turbine 70 and gives, as required and depending on the operating point, the manipulated variables S for an operating parameter of the air turbine 70, for example for that of the output to be extracted from the combustion air during its release into the air turbine 70. On the inlet side, the regulating device 72 is connected to a temperature sensor 74 arranged in the fresh air pipe 64 via a signal pipe 73.

When operating the steam power plant 1, the combustion air flowing into the combustion chamber 60 is compressed in the pneumatic conveyor 66 and subsequently pre-warmed in the air pre-warmer 68. After the pre-warming, the characteristic operating parameters of the combustion air such as the pressure and temperature level then, in essence, depend on the current operating state of the steam generator 26. For example, the combustion air flowing from the air pre-warmer 68 can have a pressure of approximately 4.8 to 5.2 bar and a temperature of approximately 500° C. However, such operating parameters are not necessarily favorable for combustion in the combustion chamber 60. In particular, the temperature level of the combustion air can be significantly higher than a temperature level desirable for thermodynamic reasons.

In order to use this temperature level, which is possibly too high, to increase efficiency, the combustion air flowing from the air pre-warmer 68 is then at least partially released in the air turbine 70 in an output-producing manner before the introduction thereof into the combustion chamber 60. As a result, the combustion air is routed via the air turbine 70, in which case it drives this and in which case the pressure of the combustion air is approximately 1.2 bar and the temperature approximately 300° C. As a result of the partial release into the air turbine 70, the combustion air is therefore brought to particularly suitable operating parameters for combustion in the combustion chamber 60, in which case utilization of the output gained during the release is possible. In the embodiment, the air turbine 70 then drives the pneumatic conveyor 66 so that a comparatively direct drive of the pneumatic conveyor 66 is reached by avoiding an unnecessarily high number of loss-carrying intermediate stages during energy conversion.

In order to adhere to a particularly favorable parameter level in the combustion air for the combustion in various operating conditions, the regulating device 72, via the temperature sensor 74, regularly monitors the operating parameters of the combustion air flowing into the combustion chamber 60. Therefore, it should in particular be ensured that despite the release of the combustion air in the air turbine 70, a sufficiently high temperature level of the combustion air is adhered to for favorable combustion in the combustion chamber 60 in each operating state for thermodynamic reasons. As required, the regulating device 72 of the air turbine 70 supplies reference values for influencing the output to be extracted from the combustion air during its release. Thus, throttling members can for example be set to a favorable manipulated variable depending on the operating point.

Figure 2:
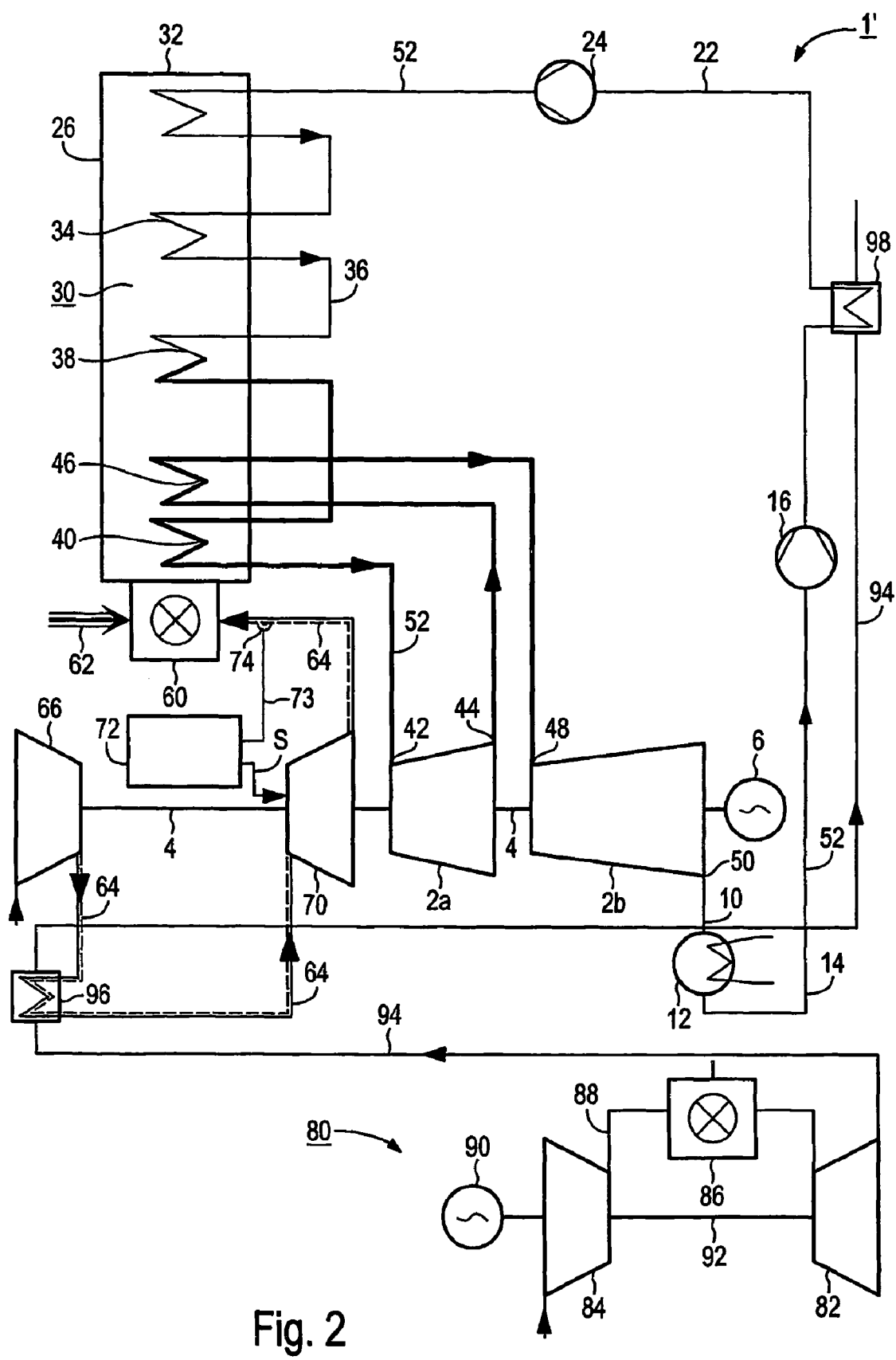
FIG. 2 diagram of a steam power plant combined with a gas turbine plant.

The steam power plant 1' according to FIG. 2 is also designed for pre-warming the compressed compression air for the combustion chamber 60 with subsequent partial release in an output-producing manner in an air turbine 70. However, the steam power plant 1' according to FIG. 2 is designed for a combined arrangement with an assigned gas turbine plant 80. This includes a gas turbine 82 with a connected air compressor 84 and a combustion chamber 86 mounted upstream of the gas turbine 82, said combustion chamber 86 being connected to a compressed air pipe 88 of the air compressor 84. The gas turbine 82 and the air compressor 84 as well as an assigned generator 90 are located on a common shaft 92.

In the embodiment according to FIG. 2, the gas turbine plant 80 is connected to the steam power plant 1' in such a way that waste gas flowing from the gas turbine 82 is used to pre-warm the air and the feed water for the steam power plant 1'. To this end, a heat exchanger embodied as an air pre-warmer 96 for the combustion air of the steam power plant 1' is mounted on the primary side in a flue gas duct 94 mounted downstream of the gas turbine 82. The air pre-warmer 96 is then mounted on the secondary side in the fresh air pipe 64 of the steam power plant 1', making possible a heat transfer of waste gas or flue gas flowing from the gas turbine 82 to the combustion air for the combustion chamber 60 compressed in the pneumatic conveyor 66. The air turbine 70 is then mounted between the air pre-warmer 96 and the combustion chamber 60 in the fresh air pipe 64 so that the fresh air pre-warmed in the air pre-warmer 96 can be at least partially released there.

For an ongoing utilization of the residual heat carried along in the flue gas flowing from the gas turbine 82, a heat exchanger embodied as a feed water pre-warmer 98 is mounted on the primary side in the flue gas duct 94. The feed-water pre-warmer 98 is then mounted on the secondary side in the supply pipe 22 of the steam power plant 1'.

What is claimed is:

1. A method for operating a steam power plant comprising:
    providing a steam generator;
    providing a combustion chamber fluidly connected to the steam generator;
    feeding pre-warmed combustion air and a fossil fuel into the combustion chamber;
    releasing the combustion air through an air turbine after the combustion air is pre-warmed and before being introduced into the combustion chamber;
    connecting a regulating device to the air turbine and a temperature sensor such that the regulating device controls the output to be extracted from the combustion air as the combustion air flows through the air turbine; and
    setting the output extracted during release on the basis of a characteristic value for the temperature of the combustion air sensed by said sensor flowing toward the combustion chamber.

2. The method according to claim 1, wherein a pneumatic conveyor provided for compressing the combustion air is driven via the output gained when releasing the pre-warmed combustion air.

3. The method according to claim 1, wherein the combustion air is pre-warmed within the steam generator.

4. The method according to claim 1, wherein the combustion air is pre-warmed via flue gas flowing from a gas turbine.

5. The method according to claim 4, wherein feed water is pre-warmed for the steam generator via the flue gas flowing from the gas turbine.

6. The method according to claim 1, wherein the combustion air is partially released in an output-producing manner.

7. The method according to claim 1, wherein the characteristic value is the temperature level or the pressure.

8. The method according to claim 2, wherein the combustion air is pre-warmed within the steam generator.

9. The method according to claim 2, wherein the combustion air is pre-warmed via flue gas flowing from a gas turbine.

10. The method according to claim 1, wherein the temperature of the pre heated combustion air is cooled by expanding the combustion air through the air turbine.

11. The method according to claim 1, wherein the combustion air is cooled to a temperature level adapted to a specific operating state of the steam power plant.

12. The method according to claim 10, wherein the pre heated combustion air is compressed by a compressor powered by the expanded combustion air from the air turbine.

* * * * *